United States Patent [19]

Graham

[11] Patent Number: 4,492,904

[45] Date of Patent: Jan. 8, 1985

[54] WINDSHIELD WIPER SYSTEM WITH TOUCH CONTROL

[75] Inventor: Donald E. Graham, Centerville, Ohio

[73] Assignee: General Motors Corporation, Detroit, Mich.

[21] Appl. No.: 625,567

[22] Filed: Jul. 2, 1984

Related U.S. Application Data

[63] Continuation of Ser. No. 528,629, Sep. 1, 1983, abandoned.

[51] Int. Cl.³ .............................................. H02P 1/10
[52] U.S. Cl. .................................. 318/444; 318/443; 318/DIG. 2; 15/250 C
[58] Field of Search .................. 318/443, 444, DIG. 2

[56] References Cited

U.S. PATENT DOCUMENTS

| | | | |
|---|---|---|---|
| 4,355,270 | 10/1982 | Cook et al. | 318/443 |
| 4,375,610 | 3/1983 | Nagaoka et al. | 318/444 |
| 4,388,574 | 6/1983 | Bois et al. | 318/444 X |

FOREIGN PATENT DOCUMENTS

| | | | |
|---|---|---|---|
| 55-99441 | 1/1980 | Japan | 318/444 |
| 55-152642 | 11/1980 | Japan | 318/443 |

Primary Examiner—J. V. Truhe
Assistant Examiner—Bentsu Ro
Attorney, Agent, or Firm—Robert M. Sigler

[57] ABSTRACT

A windshield wiper control system has operations controlled by single touch actuators. A first such actuator provides for initiation of wiper operation in low speed with the first actuation and alternate high and low speed operation with additional actuations. A second such actuator stops wiper operation and, if actuated while the wiper is not running, initiates a single wipe of the wiper. A further actuator may be provided for initiation of either programmed or operator controlled wash operation, depending on the length of actuation. A final actuator may be provided for two touch intermittent wiper operation, in which the operator sets the delay time by two consecutive touches. Variations are described for either depressed park or non-depressed park systems.

6 Claims, 11 Drawing Figures

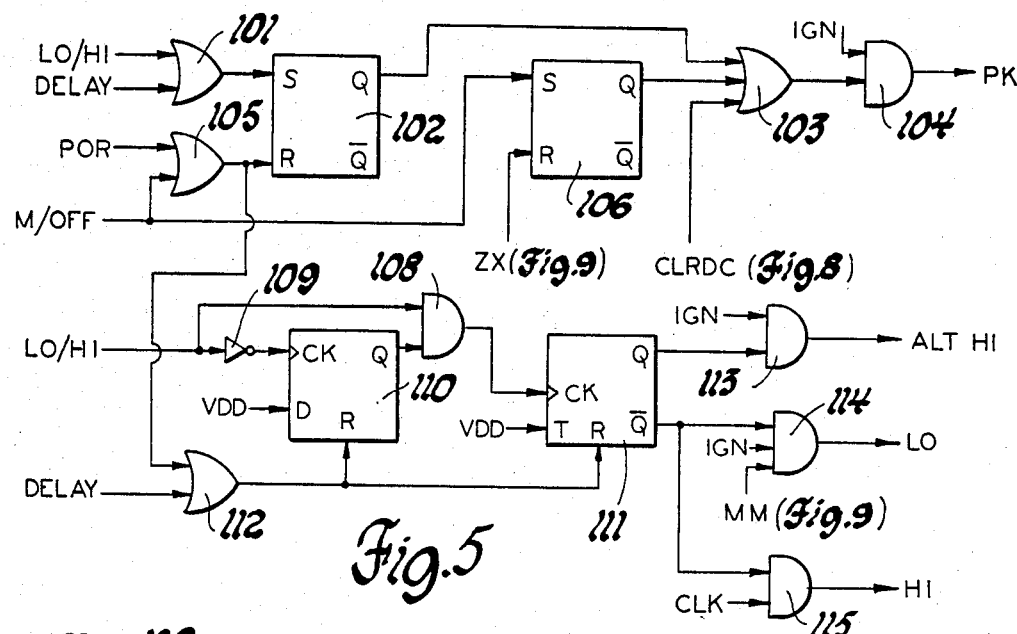
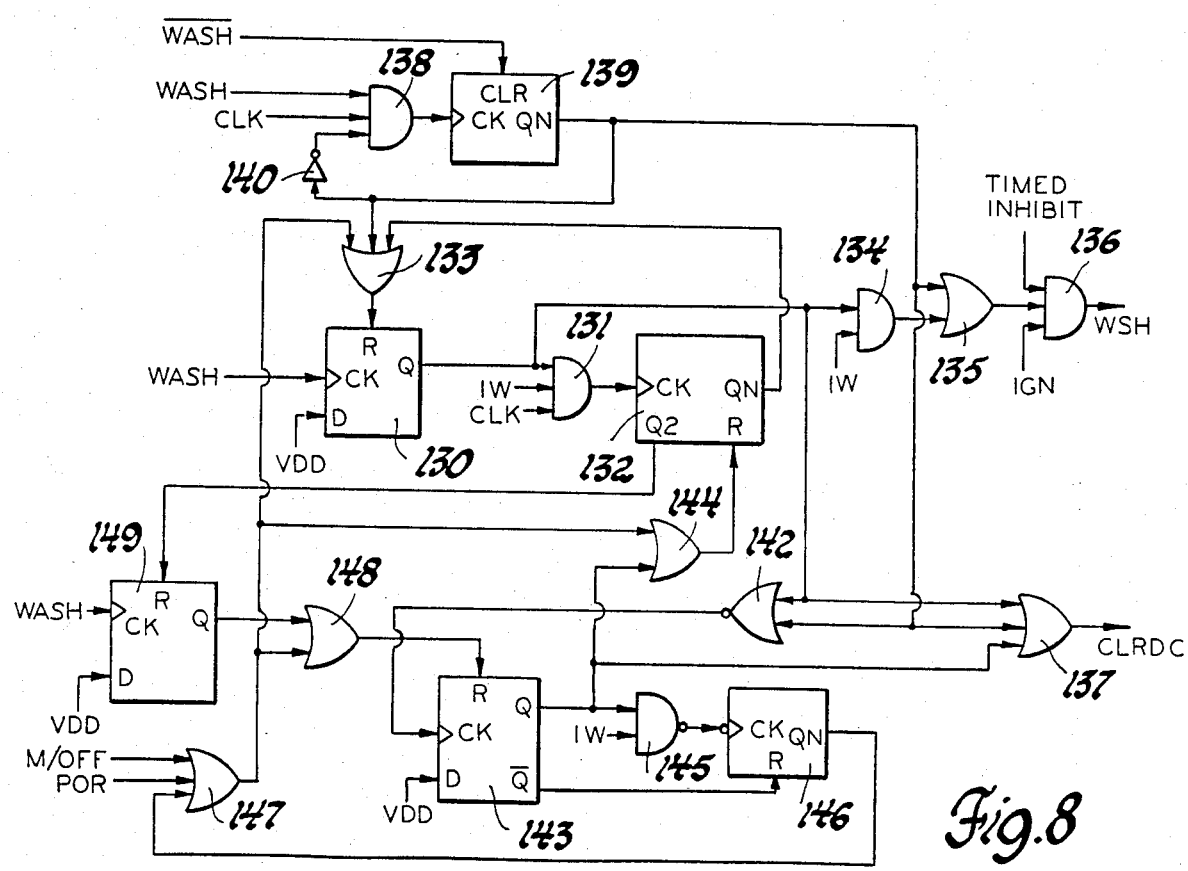

WINDSHIELD WIPER SYSTEM WITH TOUCH CONTROL

This is a continuation of application Ser. No. 528,629, filed on Sept. 1, 1983, now abandoned.

SUMMARY OF THE INVENTION

This invention relates to a control for a windshield wiper system on a motor vehicle. It particularly relates to such a control with a minimum number of easily operated control actuators which control multiple modes of system operation.

Specifically, the invention relates to a windshield wiper drive control apparatus having a pair of single touch actuators, one of which initiates windshield wiper action with a first touch and toggles back and forth between two modes of windshield wiper operation, such as high speed and low speed, with additional touches. The second actuator turns the windshield wiper system off if touched while the windshield wiper system is operating and causes a single wipe cycle of the windshield wipers if touched while the system is not operating. Further windshield wiper control functions may be added with additional single touch operators, such as, for example, an additional actuator to initiate and control intermittent or delay windshield wiper operation with control of delay time and yet another single touch operator to initiate, alternatively, preprogrammed or operator controlled windshield washer operation. Further details and advantages of this invention are described in the accompanying drawings and following description of a preferred embodiment.

SUMMARY OF THE DRAWINGS

FIGS. 5-10 show detailed logic and circuit diagrams of different portions of chip 25 in the system of FIG. 3.

DESCRIPTION OF THE PREFERRED EMBODIMENT

Figure 1:
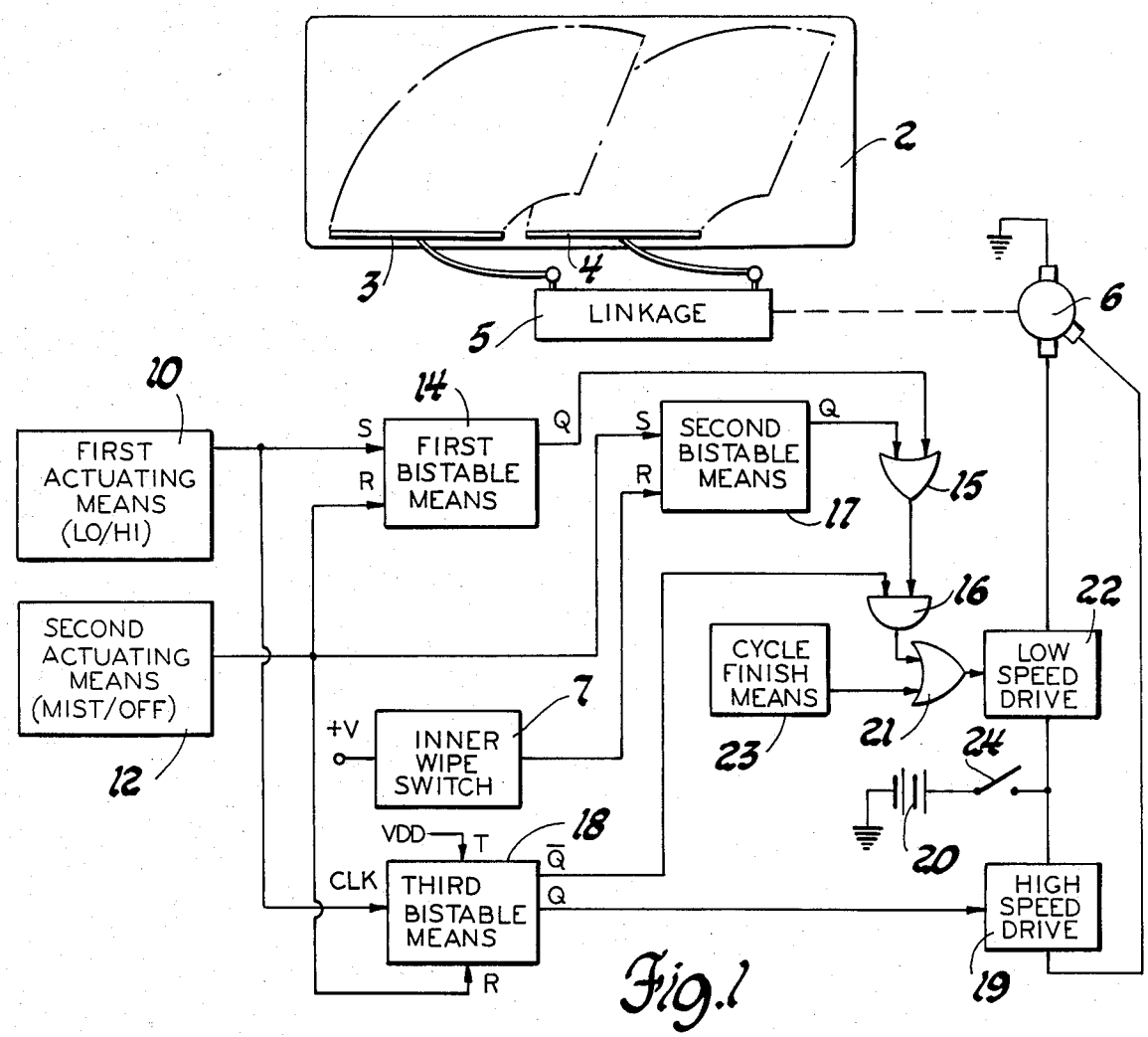
FIG. 1 shows a block and schematic diagram of a preferred embodiment of this invention.

Embodiment of FIG. 1

Referring to FIG. 1, the windshield 2 of a motor vehicle is cleaned by a pair of wiper blades 3 and 4 which clean an area of windshield 2 defined by the broken lines. Blades 3 and 4 are driven through a linkage 5 by a motor 6 which, in this embodiment, is a three brush, permanent magnet motor. However, motor 6 could alternatively be a DC wound field motor or any other suitable motor. In addition, motor 6 and linkage 5 could be replaced by a pair of motors, one driving each wiper blade, the motors being linked mechanically or electrically to act in unison.

Motor 6 or linkage 5 has associated therewith an inner wiper switch 7, actuated by a cam when the wipers reach an inner wipe position that defines the lower end of their normal wipe cycle. For a non-depressed wiper system this is also a park position for wipers 3 and 4 when not in use. In a depressed park system, however, a lower park position is defined.

Figure 2:
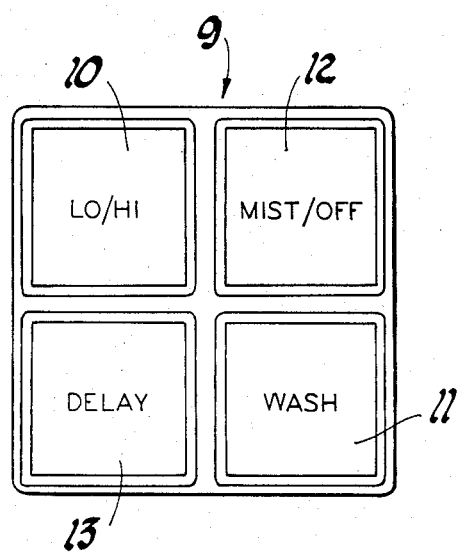
FIG. 2 shows a frontal view of an input touch pad for this invention suitable for the dashboard of a motor vehicle.

First actuating means 10 and second actuating means 12 are identical single-pole, single-throw switches of the momentary contact type, preferably touch or pushbutton operated and located on the dashboard or some other portion of the vehicle passenger compartment within easy reach of the vehicle operator. In this embodiment the first and second actuating means appear to the operator as the upper two touch pads of a dash switch unit 9, as seen in FIG. 2, with the first actuating means 10 labelled LO/HI and the second actuating means 12 labelled MIST/OFF. Two other touch pads 11 and 13, labelled WASH and DELAY, respectively, are shown in FIG. 2 and will be described at a later point in the specification.

First actuating means 10 provides an output to the set (S) input of first bistable electronic circuit means 14, which has a reset (R) input effective to receive the output from the second actuating means 12. The Q output of first bistable electronic circuit means 14 is provided to one input of an OR gate 15 having an output connected to the input of an AND gate 16. The output of the second actuating means 12 is provided to the set (S) input of a second bistable electronic circuit means 17 having a Q output connected to the other input of OR gate 15. The output of first actuating means 10 is provided to the CLK input of a third bistable electronic circuit means 18 having a $\overline{Q}$ output connected to the other input of AND gate 16 and a Q output connected to actuate high speed drive 19 which, when actuated, connects an electric power supply 20, which may be the vehicle battery or alternator, through ignition switch 24 to the high speed brush of motor 6. The output of AND gate 16 connects to one input of an OR gate 21, the output of which is connected to actuate low speed drive 22. Low speed drive 22, when actuated, connects electric power supply 20 to the low speed brush of motor 6 through ignition switch 24.

Third bistable electronic circuit means 18 has a reset (R) input actuated by the second actuating means 12. Further, it incorporates elements effective to prevent a change in its output after it is reset until the second actuation of the CLK input by the first actuating means 10. The second and subsequent actuations of the CLK input cause reversals of its output state. The second bistable electronic circuit means has a reset (R) input connected to a regulated voltage +V, as described further in FIG. 3, through inner wipe switch 7 so as to be reset when the wipers 3 and 4 are not in their inner wipe position. Finally, cycle finish means 23 provides an output to the other input of OR gate 21 and will be described in greater detail below.

In operation, closure of the vehicle ignition switch, not shown, causes connection of the circuit as shown in FIG. 1 with all bistable electronic circuit means or bistable means 14, 17 and 18 reset, with Q outputs low and $\overline{Q}$ outputs high. Neither low speed drive 22 nor high speed drive 19 is actuated; and wipers 3 and 4 are parked with the inner wipe switch open. In a non-depressed park system wipers 3 and 4 are parked in the inner wipe position. In a depressed park system wipers 3 and 4 are parked in a lower park position, but the cam is sufficiently wide to maintain the inner wipe switch open from the inner wipe to the park position.

When first actuating means 10 is first actuated, first bistable means 14 is set and the $\overline{Q}$ output of third bistable means 18 remains high. Thus low speed drive 22 is actuated and wipers 3 and 4 are cycled continuously. Another actuation of first actuating means 10 toggles third bistable means 18 to a second state with output $\overline{Q}$ low and output Q high. Thus low speed drive 22 is deactivated and high speed drive 19 actuated. Further actuations of first actuating means 10 cause further reversals in the output state of third bistable means 18 with resultant switching between low speed drive 22 and high speed drive 19.

Actuation of second actuating means 12 causes first bistable means 14 to reset to a low output and third bistable means 18 to reset to its first output state in which $\overline{Q}$ is high and Q is low, if it is not already in this state. In order to prevent the wipers from immediately stopping, the cycle finish means enables the low speed drive to drive the wipers in the low speed mode to their park position. In the case of a non-depressed park system, in which the park position and inner wipe position are identical, cycle finish means 23 may comprise the output of the inner wipe switch 7. In a depressed park system, the cycle finish means is a mechanical latch that holds a relay armature closed after the actuating coil is deactivated until the wipers reach the park position, as shown and described, for example, in the U.S. patent to Romanowski No. 3,253,206, issued May 24, 1966.

Finally, with the motor off and the wipers parked, a single wipe cycle may be initated by actuating second actuating means 12. This sets second bistable means 17 to a high output which, together with the high $\overline{Q}$ output of third bistable means 18, generates a high output from AND gate 16 to actuate the low speed drive means and drive the wipers out of the park position. When the inner wiper switch 7 closes, second bistable means 17 resets, but cycle finish means 23 takes over to complete the cycle. This provides the mist feature useful for cleaning a slight mist from the windshield with a single wipe of the blades.

The functions described to this point are obtained with the use of two single-pole, single-throw momentary contact switches, which may be touch or pushbutton actuated, and in such a way as to provide logical operation of these push buttons by the vehicle operator. It is natural to actuate a first pushbutton to turn a mechanism on and a second pushbutton to turn a mechanism off. In addition, it can be easily learned that the ON pushbutton also controls the speed selection of the system and that if the special single wipe mode is desired, the OFF button should be pushed rather than the ON button. Thus, the mode of operation of the system may be easily learned by a vehicle operator and accomplished in practice without requiring undue attention of the operator as the vehicle is being driven.

Figure 3:
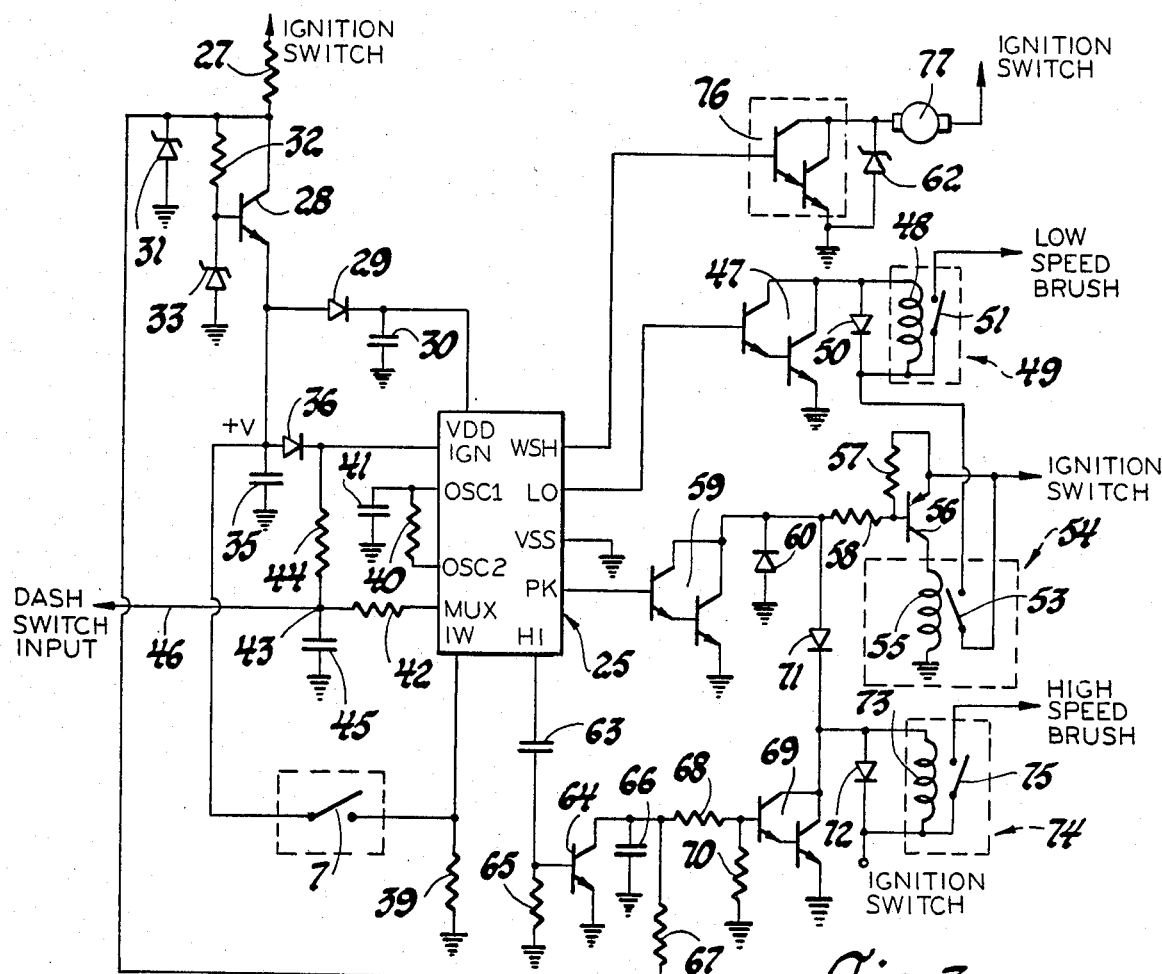
FIG. 3 shows a circuit diagram of the main portion of the particular embodiment of the system shown in FIG. 1.

Depressed Park Embodiment of FIG. 3

A depressed park embodiment of the system is described in detail, beginning with FIG. 3. A main control chip 25 could be a properly programmed digital computer; however, in this embodiment it is a custom designed digital logic control system on a single chip. The various inputs and outputs to chip 25 are labelled in the drawing and their connections to further circuit apparatus are shown. Electrical power from the vehicle electrical power supply is provided through the vehicle ignition switch, a resistor 27, the collector and emitter of an NPN transistor 28 and a diode 29 to the VDD input of chip 25, which input is also connected through a capacitor 30 to ground. The collector of transistor 28 is further connected through a Zener diode 31 to ground and also through a resistor 32 to the base of transistor 28, which base is connected through a Zener diode 33 to ground. Elements 27 through 33 comprise a regulated power supply for chip 25 with a comparatively large storage capacitor 30 effective to continue to provide power to chip 25 for a predetermined period of time after the vehicle ignition switch is opened. The emitter of transistor 28 is further connected to ground through a capacitor 35 and, through a diode 36, to an ignition or IGN input of chip 25. This input provides an ignition signal to the chip 25 so that the chip 25 knows when the ignition has been turned off even though power is still being supplied thereto. The emitter of transistor 28, at which regulated voltage +V is generated, is further connected through the inner wipe switch 7 to the IW input of chip 25, which input is further connected through a resistor 39 to ground. This input provides chip 25 with information as to the state of the inner swipe switch 7. Chip 25 further has two oscillator inputs, OSC 1 and OSC 2, which are connected to each other through a resistor 40 with OSC 1 further connected to a capacitor 41 to ground. Chip 25 includes an on-chip oscillator which uses the external capacitor 41 and resistor 40 to help determine the period of oscillation. Another input to chip 25 is the multiplex or MUX input which is connected through a resistor 42 to the junction 43 of a resistor 44 and a capacitor 45. Junction 43 is connected to the dash switch input, to be described at a later point in this specification, and further, through resistor 44 to the IGN input of chip 25 and through capacitor 45 to ground. Finally, input VSS connects to ground.

The LO output connects to the base of an NPN Darlington transistor 47 having a grounded emitter and a collector connected to the actuating coil 48 of a relay 49 and a parallel, free wheeling diode 50. The other end of actuating coil 48 is further connected through the armature 51 of relay 49 to the low speed brush of motor 6 and through the armature 53 of a relay 54 to the vehicle ignition switch. Actuating coil 55 of relay 54 has one end grounded and the other end connected to the collector of a PNP transistor 56, which has its emitter connected to the vehicle ignition switch and, through a resistor 57, to its own base. The base of transistor 56 is connected through a resistor 58 to the collector of an NPN Darlington transistor 59 having a grounded emitter and a base connected to the PK output of chip 25. The collector of transistor 59 is further connected through a back-biased diode 60 to ground.

The HI output of chip 25 is connected through a capacitor 63 to the base of an NPN transistor 64 having a grounded emitter. The base of transistor 64 is further connected through a resistor 65 to ground; and the collector of transistor 64 is connected through a capacitor 66 to ground and further through a resistor 67 to the collector of transistor 28. The collector of transistor 64 is also connected through a resistor 68 to the base of an NPN Darlington transistor 69 having a grounded emitter. The base of transistor 69 is connected through a resistor 70 to ground; and the collector is connected through a back-biased diode 71 to the collector of transistor 59 and through a diode 72 and parallel actuating coil 73 of a relay 74 to the ignition switch IGN, which itself is connected through the armature 75 of relay 74 to the high speed brush of motor 6.

Finally, the WSH output of chip 25 is connected to the base of a grounded emitter, Darlington NPN transistor 76 having a collector connected through a standard washer pump motor 77 to the ignition switch. A Zener diode 62 is connected across the collector and emitter of transistor 76.

In operation, a high output from output PK of chip 25 actuates transistors 59 and 56 to cause relay armature 53 to pull closed and thereby provide a connection between the ignition switch and the armature of relay 49. A high output from the LO output of chip 25 will actuate relay 49 to connect ignition voltage to the low speed brush and actuate the wipers at low speed. Relay 54 is of the type previously mentioned as described in the U.S. Pat. No. 3,253,206. It includes mechanical latch apparatus to remain closed until coil 55 is deactivated and wipers 3 and 4 reach their park positions. The HI output of chip 25 could be connected directly to the base of transistor 69 so that a high output thereon would actuate relay 74 to connect ignition to the high speed brush. However, in this embodiment, chip 25 generates an oscillating output on the HI output while high speed operation is not desired. This oscillating output cycles transistor 64 on and off to repeatedly discharge capacitor 66, which is being continually charged from the ignition through the resistors 27 and 67. When high speed is chosen and the oscillating output from chip 25 ceases, capacitor 66 is allowed to charge and eventually turns on transistor 69 to actuate relay 74 and connect non-ignition voltage to the high speed brush for high speed wiper operation. When transistor 69 turns on, diode 71 causes transistor 56 to turn on if it is not already on and thereby actuate relay 54. This circuit arrangement provides for automatic selection of high speed wiper operation if chip 25 should fail while the ignition is on.

It should be noted that, in the embodiment shown, the opening of the ignition switch with the wiper system operating will result in the wipers stopping immediately at whatever point in their pattern they happen to occupy. The alternative connection of the armature 53 of relay 54 to battery potential bypassing the ignition switch would have the effect that, when the ignition is turned off, relay 54 would remain closed and the wipers would continue to operate at low speed. Logic could be provided to continue such operation until the desired park position is reached, at which point the system would turn the wipers off. If, for some reason, the wipers were mechanically prevented from returning to the park position, such operation would continue only as long as the short-term keep alive power supply continued to power chip 25.

Switch Multiplex Apparatus

Figure 4:
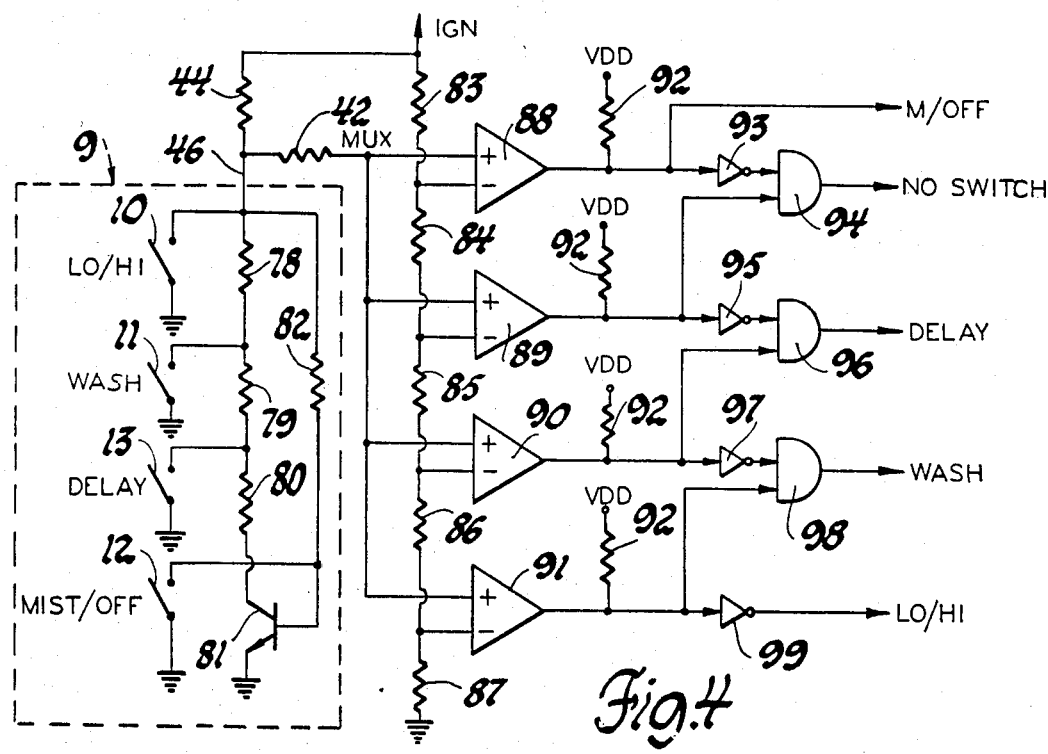
FIG. 4 shows a circuit diagram of input apparatus suitable for connecting the touch pad of FIG. 2 to the circuit of FIG. 3.

As can be seen from the circuit of FIG. 3, chip 25 has a single MUX input for the control switches and a single input line from the dash switch assembly. FIG. 4 shows the dash switch circuit and the electronics and logic internal to chip 25 which are required to voltage-multiplex the dash switch signal. From the chip IGN input, a circuit can be traced through resistor 44, line 46, resistor 78, resistor 79, resistor 80 and the collector and emitter of an NPN transistor 81 to ground. The base of transistor 81 is connected to ground through MIST/OFF switch 12 and is also connected through a resistor 82 to the junction of resistors 44 and 78, which junction is also connected to ground through LO/HI switch 10. The junction of resistors 78 and 79 is connected to ground through WASH switch 11; and the junction of resistors 79 and 80 is connected to ground through DELAY switch 13. Elements 10, 11, 12, 13, 78, 79, 80, 81 and 82 are all included within the dash switch unit 9, which is connected to the rest of the washer apparatus through line 46 and a common ground and which generates on line 46 a voltage which is a fraction of the ignition voltage, the fraction depending on which of the switches is closed. Resistors 44, 78, 79 and 80 have resistance values forming a ratio such as 3:1:2:6 so that closure of the switches numbered 10, 11 or 13 results in a voltage on line 46 which is 0%, 25% or 50% of the ignition voltage, respectively. The resistance of resistor 82 depends in part on the characteristics of transistor 81; but in any case it is chosen to be sufficiently large that, if MIST/OFF switch 12 is closed, the voltage on line 46 is only slightly less than the voltage appearing at the IGN input of chip 25. Resistor 82 further ensures that, if no switch is closed, transistor 81 will conduct; and the voltage on line 46 will be approximately 75% of the chip IGN voltage.

Within chip 25, resistors 83, 84, 85, 86 and 87 form a series of voltage dividers between the IGN input and ground. The resistance ratio of these resistors is 1:2:2:2:1. The junctions of these resistors are connected to the inverting inputs of op amps 88, 89, 90 and 91, respectively. The outputs of these op amps are connected to chip input VDD through identical resistors, which are given the common reference 92, with the result that these op amps act as comparators. The non-inverting inputs of each of the op amps are all connected to the MUX input of chip 25, which is in turn connected through resistor 42 to line 46. The output of comparator 88 provides a M/OFF signal within chip 25. It is further provided through an inverter 93 to one input of an AND gate 94. The output of comparator 89 is provided to the other input of AND gate 94 to provide a NO SWITCH signal therefrom within chip 25. The output of comparator 89 is further provided through an inverter 95 to one input of an AND gate 96, which receives at its other input the output of comparator 90 and which provides, at its output, a DELAY signal within chip 25. The output of comparator 90 is further provided through an inverter 97 to one input of an AND gate 98, which receives at its other input the output of comparator 91 and which generates at its output a WASH signal within chip 25. Finally, the output of comparator 91 is supplied through an inverter 99 to generate a LO/HI signal within chip 25.

As an example of the operation of the circuit shown in FIG. 4, the result of the actuation of the LO/HI switch 10, the MIST/OFF switch 12 and NO SWITCH will be described. When LO/HI switch 10 is closed, the non-inverting inputs of all the comparators are provided with a ground voltage signal so that their outputs all go low. Since each of the AND gates 94, 96 and 98 has at least one input from a comparator, their outputs are all low. However, inverter 99 inverts the low output of converter 91 into a high LO/HI signal. If the MIST/OFF switch 12 is closed, resistors 44 and 82 from a voltage divider across the chip IGN voltage; and, since resistor 82 is much greater than resistor 44 (in the ratio of, for example, 200:3), a voltage is provided to the non-inverting inputs of each of the comparators which causes all the outputs to go high. These high outputs are inverted to low signals by each of the inverters 93, 95, 97 and 99; but the high output of comparator 88 provides a high M/OFF signal within chip 25. If no switch is closed, transistor 81 conducts so that resistors 44, 78, 79 and 80 form a voltage divider across the chip IGN voltage. The voltage on line 46 is approximately 75% of the chip IGN voltage, which is sufficient to provide a high output from comparators 89, 90 and 91 and a low output from comparator 88. AND gate 94 receives a high input through inverter 93 from the low output of comparator 88 and a high input from comparator 89 to generate a high NO SWITCH signal within chip 25. Inverters 95, 97 and 99 each provide low output signals to ensure that no other high signals are generated. In view of the preceding description, there should be no need to describe in detail the actuation of WASH switch 11 or DELAY switch 13. Each of the five signal outputs of FIG. 4 is processed with suitable debounce circuitry similar to that shown in FIG. 10, to be described at a later point in this specification.

Low Speed, High Speed and Single Wipe Operation

Referring to FIG. 5, the debounced LO/HI and DELAY signals are provided to the two inputs of an OR gate 101 having an output connected to the S input of an RS flip flip 102. The Q output of flip flop 102 is provided to one input of an OR gate 103 having an output connected to one input of an AND gate 104. The output of AND gate 104 is the PK signal applied to the PK output of chip 25. A power-on-reset or POR signal and the debounced M/OFF signal are provided to the two inputs of an OR gate 105 having an output connected to the reset (R) input of flip flop 102. The debounced M/OFF signal is further provided to the set (S) input of an RS flip flop 106 having a Q output connected to another input of OR gate 103. The third and last input to OR gate 103 is a signal labelled CLRDC and obtained from the apparatus shown in FIG. 8. The reset or R input of flip flop 106 receives a signal labelled ZX, which is obtained from the apparatus shown in FIG. 9. The POR signal is obtained from the circuit shown in FIG. 6.

Continuing with the circuit in FIG. 5, the debounced LO/HI signal is applied to one input of an AND gate 108 and also through an inverter 109 to the CK input of an D flip flop 110. The D input of flip flop 110 is connected to input VDD of chip 25; and the Q output is connected to the other input of the AND gate 108. The output of AND gate 108 is connected to the CK input of a toggle flip flop 111 having a T input connected to input VDD of chip 25. The debounced DELAY signal and the output of OR gate 105 are connected to the two inputs of an OR gate 112 having an output connected to the reset (R) inputs of flip flops 110 and 111. The Q output of flip flop 111 and the IGN signal are connected to the two inputs of an AND gate 113 having an output labelled ALT HI, which is an optional output for chip 25 which may be connected directly to the base of transistor 69 in FIG. 3 as previously described. The $\overline{Q}$ output of flip flop 111 is connected to one input of AND gate 114 and one input of AND gate 115. AND gate 114 generates at its output the LO signal applied to the LO output of chip 25 and has as further inputs the IGN signal and a signal labelled MM, which is obtained from the apparatus in FIG. 9. AND gate 115 generates at its output the HI signal connected to the HI output of chip 25 and includes as a further input the CLK or clock signal generated by the clock oscillator circuit of FIG. 7.

Flip flop 102 of FIG. 5 corresponds to the first bistable means 14 of FIG. 1. Actuation of LO/HI switch 10 or DELAY switch 13 sets the Q output of flip flop 102 high to generate a high PK signal, as long as the ignition switch is closed, and thereby actuate run relay 54 of FIG. 3. Actuation of LO/HI switch 10 further provides a high signal to one input of AND gate 108; but the other input receives a low Q output from flip flop 110, which was previously reset by the POR signal and has not yet received a positive edge trigger on its CK input. Release of LO/HI switch 10 provides this trigger through inverter 109 to set output Q of flip flop 110 high but removes the high signal from the one input of AND gate 108 so that flip flop 111 remains reset with low Q and high $\overline{Q}$ outputs. This a high LO signal on gate 114 is provided to actuate relay 49 of FIG. 3 and connect a circuit to the low speed brush of motor 6 in FIG. 1 through relays 49 and 54 of FIG. 3. AND gate 115 is enabled to pass the CLK pulses of the HI signal to prevent the actuation of relay 74 for the high speed brush. The ALT HI signal is also low.

Another actuation of LO/HI switch 10 does not affect the PK signal; but it provides a high input to AND gate 108 which is now combined with another high input from flip flop 110. Flip flop 111 is thus toggled to its alternate state with high Q and low $\overline{Q}$ outputs. ALT HI is thus enabled and LO goes low. AND gate 115 is disabled so that no CLK pulses appear in the HI output. Thus relay 49 is deactivated and relay 74 actuated to provide a current path to the high speed brush of motor 6. With further actuations of LO/HI switch 10 the Q output of flip flop 110 remains high and flip flop 111 toggles the system back and forth between low and high speed operation. Thus flip flops 110 and 111 with AND gate 108 and inverter 109 are seen to comprise toggle means with a one clock delay of the first toggle and thus correspond to the third bistable means of FIG. 1.

Actuation of the M/OFF switch 12 with the wipers in operation resets flip flop 102; but mechanical latch means in run relay 54 keep it closed in spite of the low PK signal until the wipers reach their peak position. Although armature 53 of relay is maintained closed by the mechanical latch means, other mechanical means are tripped by the deactivation of coil 55 to ensure that motor 6 will drive wipers 3 and 4 into their park positions, whereupon armature switch 53 will be mechanically opened. It should be noted that the M/OFF signal also resets flip flops 110 and 111 so that this cycle finishing operation is performed at low speed. This places the wiper deactivation under control of relay 54, which affects only low speed operation. The mechanical latch means of relay 54 comprise cycle finish means 23 of FIG. 1.

If MIST/OFF switch 12 is actuated with the wipers parked, flip flop 106 is set to a high Q output to actuate relay 54 and initiate low speed wiper movement. As soon as the wipers move far enough to close the inner wipe switch, relay 106 is reset by signal ZX; but relay 54 is now latched closed and wiper operation continues for a single cycle and back to the park position.

Non-depressed Park Modification

Figure 11:
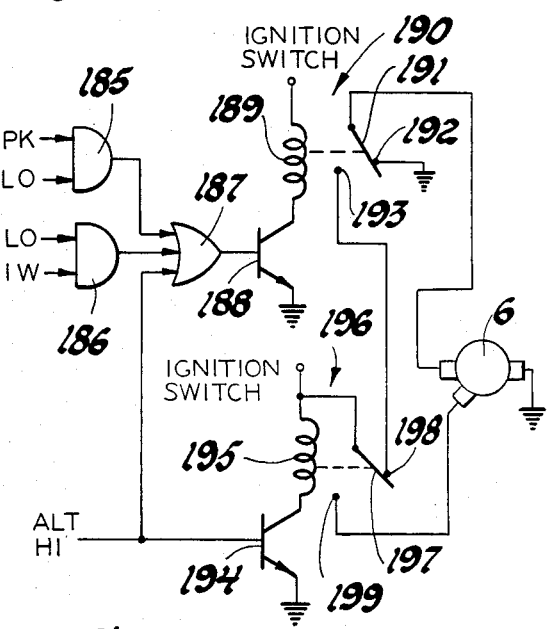
FIG. 11 shows a logic and circuit diagram of a modification of the embodiment of FIGS. 1 and 3.

Referring to FIG. 11, an adaptation of the system of FIGS. 1, 3 and 5 to a non-depressed park wiper apparatus is shown. The apparatus of FIG. 11 replaces relays 49, 54 and 74 of FIG. 3 together with associated drive circuitry through Darlington transistors 47, 59 and 69. An AND gate 185 receives the PK and LO signals as inputs. An AND gate 186 receives the LO and IW signals as inputs. An OR gate 187 receives as inputs the ALT HI signal (or is connected to the junction of resistors 68 and 70) and the outputs of AND gates 185 and 186 and provides an output to the base of a grounded emitter NPN power transistor 188. The collector of transistor 188 is connected to the ignition switch through the actuating coil 189 of a relay 190 having an armature 191 connected to the low speed brush of motor 6 and actuable from a normally closed contact 192, which is grounded, to a normally open contact 193. Another grounded emitter NPN transistor 194 has a base supplied with the ALT HI signal (or connected to the junction of resistors 68 and 70) and a collector connected to the ignition switch through the actuating coil 195 of a relay 196 having an armature 197 connected to the high speed brush of motor 6 and actuable from a normally closed contact 198, connected to contact 193 of relay 190, to a normally open contact 199 connected to the high speed brush of motor 6.

In operation, simultaneous PK and LO signals will actuate relay 190 to drive motor 6 at low speed through the relay armatures 191 and 197. An ALT HI signal or high voltage at the junction of resistors 68 and 70 actuates relay 196 to drive motor 6 through armature 197 and maintains actuation of relay 190 to prevent grounding of the low speed brush of motor 6. To provide a single wipe with the MIST/OFF switch, AND gate 185 is actuated high by flip flop 106 through the PK signal until the inner wipe switch closes and AND gate 186 then continues to actuate relay 190 until the wipers return to the inner wipe position, which in this embodiment is also the park position.

Clock Pulses

The clock pulses for the apparatus of FIGS. 5-10 are obtained from the circuit of FIG. 7, which includes the resistor 40 and capacitor 41, which are external to chip 25 and already shown in FIG. 3. FIG. 7 further shows a NAND gate 118 having a first input connected to the OSC 1 input of chip 25, a second input connected to the IGN input of chip 25 and an output connected to the OSC 2 input of chip 25. With an ignition or IGN signal applied to the IGN input of chip 25, resistor 40 provides positive feedback around NAND gate 118 to generate an oscillatory square wave output at a frequency determined by the RC combination of resistor 40 and capacitor 41.

Power-on-reset

The power-on-reset or POR signal is generated in the circuit of FIG. 6. The VDD input of chip 25 is connected through a resistor 120 in series with a parallel resistor 121 and capacitor 122 to ground. The common junction 123 of these elements provides the POR signal through an inverter 124. When power is first supplied to chip 25 through the VDD input, the voltage on junction 123 cannot rise immediately because of capacitor 122 holding the point temporarily at low potential. Thus, inverter 124 temporarily generates a high POR signal until capacitor 122 can charge up sufficiently to send the output of inverter 124 low. This provides a brief high signal at the initiation of system operation which is used to reset a plurality of devices within the apparatus shown in FIGS. 5-10. As an example, all four flip flops of FIG. 5 are reset by this signal, as will be apparent in the later description of the apparatus of FIG. 9.

Washer Operation

FIG. 8 shows the apparatus actuated by the WASH signal and effective to control washer and wiper operations during the programmed and operator controlled washer modes of operation of the system. The WASH signal is provided to the CK input of a D flip flop 130 having a D input connected to input VDD of chip 25 and a Q output connected to one input of an AND gate 131. AND gate 131 has further inputs receiving an IW signal from the apparatus of FIG. 10 and the CLK signal from the apparatus of FIG. 7. The output of AND gate 131 is provided to a CK input of a counter 132 having a QN bit output connected to one input of an OR gate 133, the output of which is connected to a reset or R input of flip flop 130. QN is a designation for a predetermined one of the outputs Q1, Q2, Q3, etc. Output Q of flip flop 130 is further connected to one input of an AND gate 134 having another input receiving the IW signal from the apparatus of FIG. 10 and an output connected to one input of OR gate 135. The output of OR gate 135 is connected to one input of an AND gate 136 which has further inputs receiving the IGN signal from chip 25 and a timed inhibit signal from apparatus not shown. The output of AND gate 136 is connected to the WSH output of chip 25 to actuate the washer pump motor 77. The timed inhibit input to AND gate 136 is an optional input from a timer which is initiated by the actuation of washer switch 11 and which switches low after a predetermined maximum wash time to protect the washer motor from overuse, if such protection is thought advisable. This time limit would not be reached in normal operation of the circuit. The Q output of flip flop 130 is further provided to one input of an OR gate 137 which provides at its output a signal labelled CLRDC, which signal is provided to OR gate 103 of FIG. 5 to generate the run signal PK.

In the operation of the circuit of FIG. 8 as described to this point, actuation of the washer switch 11 sets flip flop 130 to generate a high CLRDC output from OR gate 137. This output is applied to OR gate 103 of FIG. 5 to generate a high run signal PK and is further provided to apparatus in FIG. 10 to be described at a later point to generate a high MM signal, which is applied to AND gate 114 in FIG. 5 to generate a LO signal and actuate the wipers in low speed operation. As soon as the wipers leave the inner wipe position, inner wipe switch 7 closes to provide a high input signal IW to AND gate 134 of FIG. 8 and thus initiate action of the washer pump motor 77. As long as the inner wipe switch 7 is closed, counter 132 counts clock pulses until the QN output goes high, at which point flip flop 130 is reset through OR gate 133.

In order to provide a manual operation override for the programmed operation of flip flop 130 and counter 132, the debounced wash signal is applied to one input of an AND gate 138 having an output connected to the CK input of a counter 139. A debounced $\overline{\text{WASH}}$ signal is connected to the clear or CLR input of counter 139; and the CLK signal from FIG. 7 is provided to another input of AND gate 138. The QN output of counter 139 is provided to one input of OR gate 135, one input of OR gate 137, one input of OR gate 133 and, through an inverter 140, to the last input of AND gate 138. The QN bit of counter 139 is selected such that, in combination with the clock frequency of the system, it goes high after approximately one second of actuation of the wash switch 11. When this occurs, flip flop 130 is reset but the WSH and CLRDC signals are both maintained high independently of flip flop 130 as long as the wash switch 11 remains closed. Inverter 140 provides a low signal to remove AND gate 138 from control; however, output QN remains high until the $\overline{\text{WASH}}$ signal clears counter 139. Thus, if wash switch 11 is actuated for less than one second, flip flop 130 and counter 132 provide programmed wash duration control; however, if wash switch 11 is closed for longer than one second, counter 139 provides for washer operation as long as the operator holds WASH switch 11 closed.

In either the programmed or demand wash mode, it is desired that the wipers run for a predetermined number of cycles after the cessation of fluid delivery to the windshield to clear the excess fluid from the viewing area. Thus the Q output of flip flop 130 and the QN bit output of counter 139 are both supplied as inputs to a NOR gate 142 having an output connected to the CK input of a D flip flop 143. The Q output of flip flop 143 is provided to the third input of OR gate 137 so as to provide for continued low speed wiper operation when set high. The Q output is further provided to an OR gate 144 having an output connected to the reset input of counter 132. Finally the Q output is provided to one input of a NAND gate 145 the other input of which receives the IW signal from the apparatus of FIG. 10. The output of NAND gate 145 is provided to the CK input of a counter 146 having a reset input connected to the $\overline{Q}$ output of flip flop 143 and a QN bit output connected to one input of an OR gate 147. The output of OR gate 147 is provided to the input of another OR gate 148 having an output connected to the reset input of flip flop 143. Finally, the D input of flip flop 143 is connected to input VDD of chip 25.

In operation, when flip flop 130 and counter 139 are both reset, NOR gate 142 generates a high output to set flip flop 143 with a high Q output and a low $\overline{Q}$ output. The high Q output causes continued wiper operation in low speed through the CLRDC signal, resets counter 132 through OR gate 144 and actuates NAND gate 145 to provide a clock pulse to counter 146 with every open-to-closed transition of the inner wipe switch 7. When the required number of cycles of switch 7 have occurred, the QN output of counter 146 causes a reset of flip flop 143 through OR gates 147 and 148 to end wiper operation in the wash mode.

OR gate 147 is further provided with inputs of the debounced M/OFF signal and the POR signal. In addition, the output of OR gate 147 is provided to the other input of OR gate 144 and also to the last input of OR gate 133 to reset both flip flop 130 and counter 132 in response to the M/OFF or POR signals. Finally, a D flip flop 149 receives a clock or CK input from the debounced WASH signal and has a D input connected to input VDD of chip 25, a reset or R input from a lower bit output such as Q2 of counter 132 and a Q output connected to the other input of OR gate 148. The Q output of flip flop 149 is set high briefly between the initial actuation of wash switch 11 and the high output from the Q2 bit output of counter 132 to cause the cessation of the windshield drying cycle controlled by flip flop 143 and counter 146 in the event that the wash switch 11 is reactuated during this drying cycle.

Intermittent or Delay Operation

Figure 9:
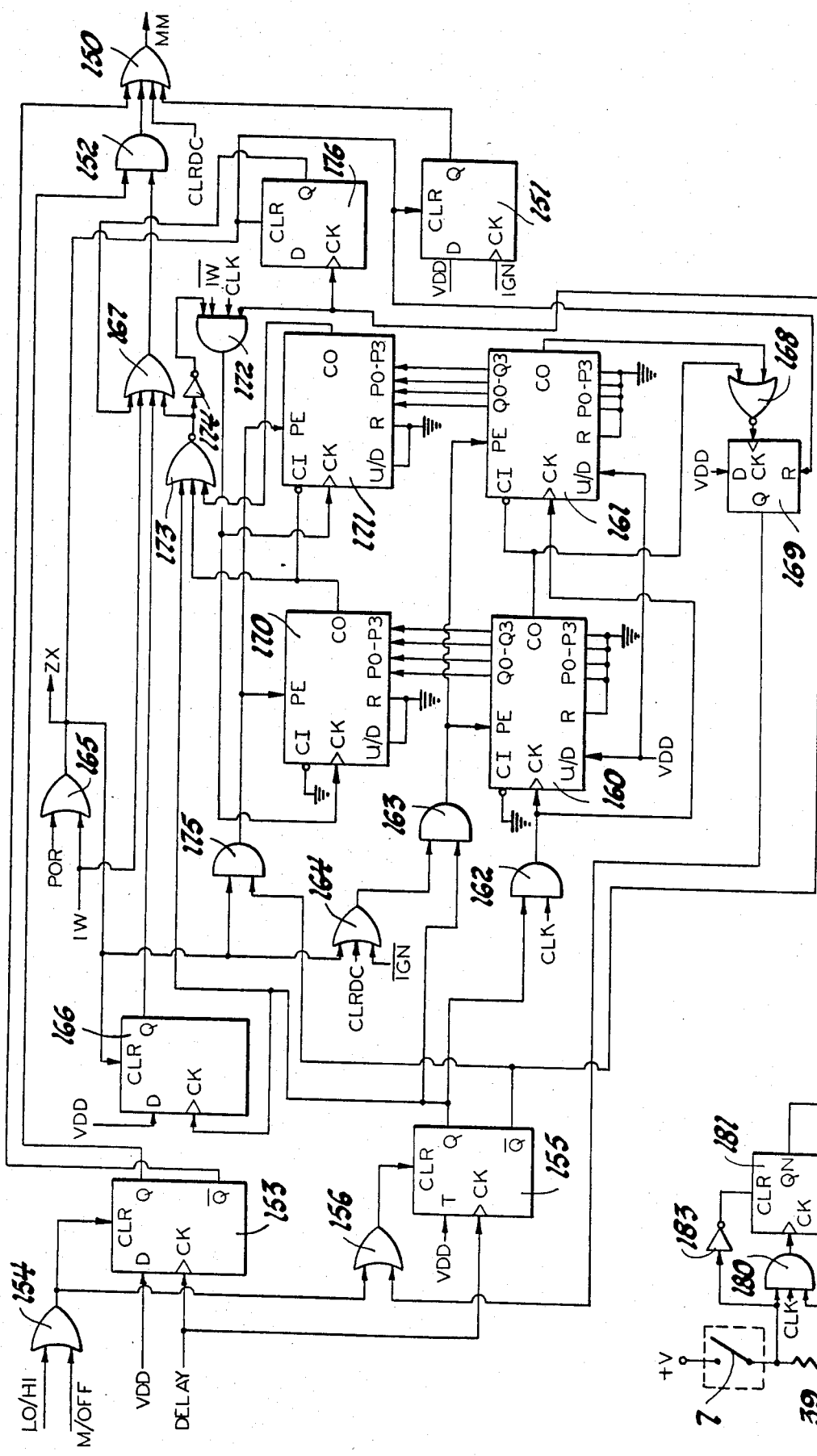

FIG. 9 shows the apparatus devoted to the control of the delay or intermittent mode of wiper operation. An OR gate 150 has an output labelled MM, which is provided to an input of AND gate 114 in FIG. 5. This output must be high for low speed wiper operation to be enabled. OR gate 150 has four inputs: one receiving the signal CLRDC from OR gate 137 in FIG. 8; one from the Q output of a D flip flop 151; one from the output of an AND gate 152; and one from the $\overline{Q}$ output of a D flip flop 153. The CLRDC signal enables low speed wiper operation as required by the wash modes, as previously described. The function of the other three inputs will be described below.

The debounced LO/HI and M/OFF signals are provided to the inputs of an OR gate 154 having an output connected to the clear or CLR input of flip flop 153. The debounced DELAY signal is applied to the CK input of flip flop 153, the D input of which is connected to input VDD of chip 25. The Q output of flip flop 153 is connected to one input of AND gate 152. Thus, actuation of the LO/HI switch 10 or the MIST/OFF switch 12 will clear flip flop 153 to provide a high $\overline{Q}$ output and thereby generate a high MM signal. However, actuation of DELAY switch 13 will clock flip flop 153 to generate a high Q output and thereby provide a high input to one input of AND gate 152. The other input of AND gate 152 is controlled by the delay circuit of FIG. 9 to generate intermittent high MM signals and thus intermittent low speed wiper operation.

The delay system of FIG. 9 is a one switch, two touch system in which the first actuation of the delay switch initiates a single wipe of the wipers followed by a delay with a counter counting. A second touch of the delay switch stops the counter, initiates a second wipe of the wipers and causes repeated alternating delays and wipes with the delays controlled by the count of the counter. In order to control the delay setting mode, a toggle flip flop 155 obtains the debounced DELAY signal at its CK input and has a CLR input connected to the output of an OR gate 156 having one input connected to the output of an OR gate 154. The toggle or T input of flip flop 155 is connected to input VDD of chip 25. Flip flop 155 is normally cleared to a high $\overline{Q}$ output by actuation of LO/HI switch 10 or MOST/OFF switch 12. Actuation of delay switch 13 will cause flip flop 155 to toggle to its alternate state with a high Q output; while a second actuation of the delay switch 13 causes a toggle back to the high $\overline{Q}$ output state. Thus, a high Q output from flip flop 155 signals the delay setting mode.

In order to count and record the desired delay, counting means are provided which in this embodiment are shown as a pair of counters 160 and 161. The input and output of these counters are described as those of the CD4516B presettable binary up/down counter, although other counting means could be substituted as desired. The counters are cascaded with the CI or carry in input of counter 160 grounded and the CO or carry out output of counter 160 connected to the CI input of counter 161. The clock or CK inputs of both counters are connected to the output of an AND gate 162 having one input receiving the CLK clock signal and the other input connected to the Q output of flip flop 155, so that a high Q output from flip flop 155 causes counters 160 and 161 to count the CLK clock pulses. The U/D or UP/DOWN inputs of counters 160 and 161 are both connected to input VDD of chip 25 so that the counters count up only. The reset or R inputs, as well as the preset or P0–P3 inputs of counters 160 and 161 are all grounded so that a preset enable causes the counters to begin counting upward from zero. The PE or preset enable inputs of counters 160 and 161 are both connected to the output of an AND gate 163 having one input connected to the Q output of flip flop 155. The other input of AND gate 163 receives the output of an OR gate 164 having an input from the output of an OR gate 165. OR gate 165 receives a POR signal from the circuit of FIG. 6 on one input and the IW signal from the circuit of FIG. 10 on the output input. Thus, although counters 160 and 161 receive clock pulses whenever the high Q output state exists in flip flop 155, they are not released to count from their zero preset unless inner wipe switch 7 is open. Apparatus may be provided to initiate a single wipe of the wipers at the beginning of the delay set mode, but the time count will not begin until the end of this single wipe.

Apparatus to provide such a single wipe includes a D flip flop 146 having a CK input connected to the Q output of flip flop 155, a D input connected to input VDD of chip 25, a CLR input connected to the output of OR gate 165 and a Q output connected to one input of an OR gate 167, the output of which is connected to the other input of AND gate 152. When the delay switch 13 is first actuated, the high Q output from flip flop 155 clocks flip flop 166 to its high Q output state to provide a high signal through OR gate 167 to AND gate 152 which, since it already receives another high input from the Q output of flip flop 153, provides a high output to OR gate 150 to generate a high MM signal and initiate wiper operation at low speed. As the wiper blades leave the inner wipe position, inner wipe switch 7 closes almost immediately and clears flip flop 166 to remove the high Q output therefrom. However, the inner wipe signal IW itself is provided to another input of OR gate 167 so that signal MM remains high until the wipers return to the inner wipe position and switch 7 opens once again. At this point signal MM goes low, and the counters 160 and 161 are enabled to begin counting. When the delay switch 13 is actuated the second time, flip flop 155 toggles to remove the clock pulses from counters 160 and 161, which store the count for control of subsequent delay periods.

Since the delay switch 13 might not be actuated the second time, the apparatus is provided with a default count limit for counters 160 and 161. The CO outputs of both counters 160 and 161 are provided to the input of a NOR gate 168 having an output connected to the CK input of a D flip flop 169. Flip flop 169 has a D input connected to input VDD of chip 25 and a Q output connected to the other input of OR gate 156. Thus, when counters 160 and 161 count up to their combined limit, low signals are generated on both CO outputs to clock flip flop 169 to a high Q output and clear flip flop 155 to a low Q output just as if delay switch 13 had been actuated a second time.

Another feature of this delay circuit is that, if the operator actuates the wash switch or turns the vehicle ignition off and then on again after initiating the delay set mode with the first actuation of delay switch 13 but before completing the delay set, counters 160 and 161 are cleared to zero for automatic resumption of the delay set mode at the end of the wash cycle or when the ignition is once again turned on. This is accomplished by the provision of the CLRDC signal from the apparatus of FIG. 8 to another input of OR gate 164 and the provision of a $\overline{IGN}$ signal, which may be obtained through an inverter from the IGN signal, to a third input of OR gate 164. Thus, either of these inputs will have the same effect as the IW signal or the POR signal in clearing the counters 160 and 161 to zero.

In order to provide subsequent repeated delay periods between wipes of the wipers 3 and 4, a second pair of counters 170 and 171 is provided. These counters have their reset or R and U/D inputs grounded. They are also cascaded with the CI input of counter 170 grounded and the CI input of counter 171 connected to the CO output of counter 170. Counter 170 has its preset or P0–P3 inputs connected to the Q0–Q3 outputs of counter 160; and counter 171 similarly has its P0–P3 inputs connected to the Q0–Q3 outputs of counter 161. The CK inputs of both counters 170 and 171 receive the output of an AND gate 172 having four inputs: the $\overline{Q}$ output of flip flop 155; the CLK signal from the apparatus of FIG. 7; the $\overline{IW}$ signal from the apparatus of FIG. 10; and the output of a NOR gate 173 through an inverter 174. NOR gate 173 has one input from the CO output of counter 171, a second input from the CO output of counter 170 and a third input from the Q output of flip flop 155. The output of NOR gate 173 is further provided as another input to OR gate 167. The PE inputs of counters 170 and 171 are both connected to the output of AND gate 175 having one input connected to the $\overline{Q}$ output of flip flop 155 and the other input connected to the output of OR gate 165.

Since the U/D inputs of counters 170 and 171 are both grounded, the counters act as down counters, counting downward toward zero from whatever preset value is loaded into input P0–P3 by the PE signal. The counters count the CLK pulses, but only in conjunction with a high $\overline{Q}$ output from flip flop 155, an open inner wipe switch 7 and CO outputs from counters 170 and 171 indicating that the counters have not yet reached zero. The counters 170 and 171 are enabled to load the preset values while the inner wipe switch 7 is closed and the flip flop 155 has a high $\overline{Q}$ output. The actual counting begins when the inner wipe switch 7 opens at the end of a wipe cycle of wipers 3 and 4.

A D flip flop 176 is provided to initiate a single wipe after the second actuation of delay switch 13. Flip flop 176 has a CK input connected to the $\overline{Q}$ output of flip flop 155, a CLR input connected to the output of OR gate 165 and a Q output connected to the fourth and final input of OR gate 167. The toggling of flip flop 155 to its high $\overline{Q}$ state clocks flip flop 176 to generate a high output, which causes a high MM signal for the initiation of low speed wiper operation. As soon as the inner wipe switch 7 closes, flip flop 176 is cleared to a low Q output; however, wiper operation is continued through the connection of the signal IW to OR gate 167. The opening of inner wipe switch 7 at the end of a single wipe sends signal MM low to stop the wipers in the inner wipe position and begin the count down of counters 170 and 171 from the count loaded in from counters 160 and 161. When the count on counters 170 and 171 reaches zero, NOR gate 173 generates a high output to both stop the application of clock pulses to counters 170 and 171 through AND gate 172 and generate a high MM signal once again through OR gate 167. The count from counters 160 and 161 is once again loaded into the preset inputs of counters 170 and 171; and the cycle repeats in this manner until the operator takes some action to discontinue the delay operation. However, it should be noticed that only actuation of the LO/HI switch 10 or the MIST/OFF switch 12 or the opening of the ignition switch for a period sufficient to time out the keep alive power supply will actually cause the system to exit the delay mode permanently. Actuation of the wash mode of operation or the turnoff and immediate turnon of the ignition switch will cause delay action to resume at the end of the wash operation or when the ignition switch is turned on, with the preset delay period.

Switch Debouncing

Figure 10:
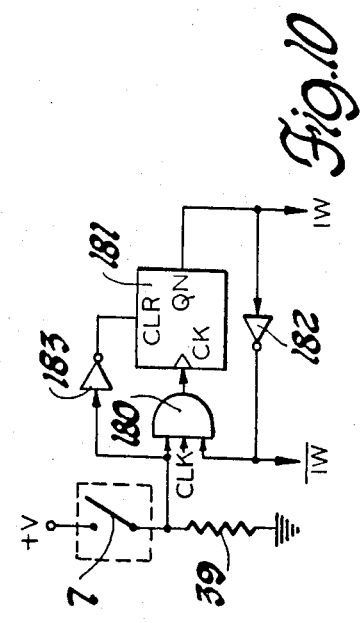

A debounce circuit for the system of FIGS. 5-10 is shown in FIG. 10. This circuit is shown in particular for the inner wipe switch 7, but a similar debounce circuit may be provided for each of the switches which need to be debounced. In FIG. 10, the inner wipe switch 7 and resistor 39 to ground are repeated for clarity, with the junction between the two, as seen in FIG. 3, corresponding to the IW input to chip 25. This junction is connected to one input of an AND gate 180 having another input receiving the CLK signal from the apparatus of FIG. 7. The output of AND gate 180 is provided to the CK input of a counter 181 having a QN output providing the debounced IW signal, from which the debounced $\overline{IW}$ signal can be generated through an inverter 182. This debounced $\overline{IW}$ signal is connected back to the third input of AND gate 180. The IW input to chip 25 is further connected through an inverter 183 to the CLR input of counter 181.

In operation, when the switch 7 attempts to close and thus generates, because of its bounce, a series of high pulses to input IW of chip 25, each return of the signal to its low level generates another clear signal through inverter 183 to prevent the counter 181 from reaching its output count QN. However, once the bouncing ends, counter 181 is able to count up to QN and generate a high debounced IW signal and low debounced not IW signal, the latter of which is fed back to AND gate 180 to prevent further counting. When switch 7 attempts to open, the initial low voltage, applied through inverter 183, clears counter 181 to send the debounced IW signal low and the debounced $\overline{IW}$ signal high. However, further bouncing of the switch upon opening does not change the state of the debounced signals since repeated clear signals prevent counter 181 from counting to QN during any of the positive excursions of the input voltage.

The embodiments of the invention in which an exclusive property or privilege is claimed are defined as follows:

1. Touch controlled drive apparatus for a wiper on a motor vehicle window comprising, in combination:
   electric motor means adapted, when actuated, to drive said wiper cyclically through a predetermined path between an inner wipe position and another position;
   high and low speed motor actuating means effective, when actuated, to actuate said motor means in high speed and low speed operational modes, respectively;
   first and second single touch actuating means;
   first bistable electronic circuit means having first and second output states responsive to actuation of the first and second single touch actuating means, respectively;
   inner wipe switch means effective to generate an output signal when the wiper is not in its inner wipe position;
   second bistable electronic circuit means having first and second output states responsive to actuation of the second single touch actuating means and inner wipe switch, respectively;
   third bistable electronic circuit means having first and second output states, the second output state being effective to actuate the high speed motor actuating means and the first output state being effective when simultaneous with the first output state of either of the first and second bistable electronic circuit means to actuate the low speed motor actuating means, said third bistable electronic circuit means being responsive to actuation of the second single touch actuation means to reset to its first output state and thereafter responsive to successive actuations of the first single touch actuation means after the first such actuation to toggle between its first and second output states; and
   cycle finish means effective to actuate the low speed motor actuation means as required to finish any cycle of wiper operation and return said wiper at least to the inner wipe position, whereby continuous wiper operation may be initiated, stopped and switched between low and high speed modes and single cycle wiper operation may be initiated with only two single touch actuators.

2. Touch controlled drive apparatus for a wiper on a motor vehicle window comprising, in combination:
   electric motor means adapted, when actuated, to drive said wiper cyclically through a predetermined path between an inner wipe position and another position;
   high speed motor actuating means effective, when actuated, to actuate said motor means in high speed operation;
   a source of electric power;
   first and second single touch actuating means;
   first bistable electronic circuit means having first and second output states responsive to actuation of the first and second single touch actuating means, respectively;
   inner wipe switch means effective to generate an output signal when the wiper is not in its inner wipe position;
   second bistable electronic circuit means having first and second output states responsive to actuation of the second single touch actuating means and inner wipe switch, respectively;
   a first relay means having normally open armature switch means, electromagnetic actuating means effective, when actuated, to close the armature switch means, mechanical latch means linked to the wiper and effective to maintain the armature switch closed until the wiper reaches a park position and means responsive to deactivation of the electromagnetic actuating means to drive the wiper to its park position, the electromagnetic actuating means being actuated by the first output state of the first or second bistable electronic circuit means;
   a second relay having normally open armature switch means in series with the first relay armature switch means, electric power source and electric motor means, the second relay further having actuating means effective to close the armature switch means when actuated; and
   third bistable electronic circuit means having first and second output states, the second output state being effective to actuate the high speed motor actuating means and the first output state being effective to actuate the second relay, said third bistable electronic means being responsive to actuation of the second single touch actuation means to reset to its first output state and thereafter responsive to successive actuations of the first single touch actuation means after the first such actuation to toggle between its first and second output states, the electric motor means being adapted, when driven through the armature switch means of the first and second relay means to drive the wiper in low speed operation.

3. Touch controlled drive apparatus for a wiper on a motor vehicle window comprising, in combination:

electric motor means adapted, when actuated, to drive said wiper cyclically through a predetermined path between an inner wipe position and another position;

low speed motor actuating means effective, when actuated, to actuate said motor means in low speed operation;

first and second single touch actuating means;

first bistable electronic circuit means having first and second output states responsive to actuation of the first and second single touch actuating means, respectively;

inner wipe switch means effective to generate an output signal when the wiper is not in its inner wipe position;

second bistable electronic circuit means having first and second output states responsive to actuation of the second single touch actuating means and inner wipe switch, respectively;

third bistable electronic circuit means having first and second output states, the first output state being effective when simultaneous with the first output state of either of the first and second bistable electronic circuit means to actuate the low speed motor actuating means, said third bistable electronic means being responsive to actuation of the second single touch actuation means to reset to its first output state and thereafter responsive to successive actuations of the first single touch actuation means after the first such actuation to toggle between its first and second output states;

cycle finish means effective to actuate the low speed motor actuation means as required to finish any cycle of wiper operation and return said wiper at least to the inner wipe position;

an electric power source;

charge storage means connected to said electric power source to receive electrical charge therefrom at a predetermined time rate;

oscillator means effective to oscillate in response to the second output state of the third bistable electronic circuit means;

discharge switch means effective in response to oscillation of the oscillator means to periodically discharge the electric charge from the charge storage means to prevent the buildup thereof to a predetermined quantity during the second output state of the third bistable electronic circuit means; and high speed motor actuating means responsive to a charge on the charge storage means greater than the predetermined quantity to actuate the motor means in high speed operation.

4. Touch controlled drive apparatus for a wiper on a motor vehicle window comprising, in combination:

electric motor means adapted, when actuated, to drive said wiper cyclically through a predetermined path between an inner wipe position and another position, the electric motor means provided with high speed and low speed drive apparatus;

first and second single touch actuating means;

first bistable electronic circuit means having first and second output states responsive to actuation of the first and second single touch actuating means, respectively;

inner wipe switch means effective to generate an output signal when the wiper is not in its inner wipe position;

second bistable electronic circuit means having first and second output states responsive to actuation of the second single touch actuating means and inner wipe switch, respectively;

third bistable electronic circuit means having first and second output states, said third bistable electronic means being responsive to actuation of the second single touch actuation means to reset to its first output state and thereafter responsive to successive actuations of the first single touch actuation means after the first such actuation to toggle between its first and second output states;

a source of electric power having first and second terminals at different electrical potentials;

first relay means having an armature connected to the low speed drive apparatus of the electric motor means, a normally closed contact connected to the first terminal of the source of electric power, a normally open contact and an actuating coil effective to actuate said armature from the normally closed to the normally open contact in response to any of (a) the second output state of the third bistable electronic circuit means together with the first output state of either the first or second bistable electronic circuit means, (b) the second output state of the third bistable electronic circuit means together with the actuation of the inner wipe switch, and (c) the first output state of the third bistable electronic circuit means; and second relay means having an armature connected to the second terminal of the source of electric power, a normally closed contact connected to the normally open contact of the first relay means, a normally open contact connected to the high speed drive apparatus of the electric motor means and an actuating coil effective to actuate the armature from the normally open to the normally closed contact in response to the first output state of the third bistable electronic circuit means.

5. Apparatus according to claim 1 and further comprising:

wash apparatus including a motor driven pump effective, when actuated, to deliver cleaning fluid to said window;

a third single touch actuating means;

first timer means initiated by said third single touch actuating means and effective for a first predetermined time period, unless deactivated, to actuate the motor driven pump;

second timer means responsive to the actuation of said third single touch actuating means for a second predetermined time period shorter than the first predetermined time period to deactivate the first timer means and maintain actuation of the motor driven pump thereafter during continued actuation of the third single touch actuating means; and means effective during actuation of the motor driven pump and for a predetermined number of wipe cycles thereafter to actuate the low speed motor actuating means.

6. Apparatus according to claim 1 and further comprising:
- a third single touch actuating means;
- fourth bistable electronic circuit means having a first output state responsive to actuation of either the first or second single touch actuating means to unconditionally enable the actuated first output of the third bistable electronic circuit means and a second output state responsive to actuation of the third single touch actuating means to conditionally enable, together with an actuating signal, the actuated first output state of the third bistable electronic control means;
- circuit means effective to provide said actuating signal when said wiper is not in its inner wipe position;
- means effective upon the first actuation of the third single touch actuating means to provide said actuating signal until the wiper leaves the inner wipe position and, when the wiper again reaches the inner wipe position, to initiate a timing operation;
- means effective upon the second actuation of the third single touch actuating means to stop said timing operation, store the time thereof and alternately and repeatedly provide said actuating signal until the wiper leaves the inner wipe position and, when the wiper again reaches the inner wipe position, pause for said stored time; and
- means responsive to actuation of the first or second single touch actuating means to deactivate said last means.

* * * * *